United States Patent [19]

Rynaski et al.

[11] Patent Number: 5,727,215
[45] Date of Patent: Mar. 10, 1998

[54] METHOD FOR REPLACING SOFTWARE MODULES UTILIZING A REPLACEMENT ADDRESS TABLE

[75] Inventors: Richard F. Rynaski, Middlefield; Brian F. Beloin, Avon, both of Conn.

[73] Assignee: Otis Elevator Company, Farmington, Conn.

[21] Appl. No.: 565,510

[22] Filed: Nov. 30, 1995

[51] Int. Cl.[6] .................................................. G06F 9/24
[52] U.S. Cl. ........................................ 395/712; 395/653
[58] Field of Search ............................. 395/651, 652, 395/653, 712, 684, 685

[56] References Cited

U.S. PATENT DOCUMENTS

| | | | |
|---|---|---|---|
| 4,724,521 | 2/1988 | Carron | 364/300 |
| 4,997,288 | 3/1991 | Rosenow | 380/2 |
| 5,008,936 | 4/1991 | Hamilton | 380/50 |
| 5,016,277 | 5/1991 | Hamilton | 380/49 |
| 5,022,076 | 6/1991 | Rosenow | 380/2 |
| 5,123,047 | 6/1992 | Rosenow | 380/50 |
| 5,128,996 | 7/1992 | Rosenow | 380/21 |
| 5,132,716 | 7/1992 | Samuels | 354/322 |
| 5,175,766 | 12/1992 | Hamilton | 380/49 |
| 5,175,828 | 12/1992 | Hall et al. | 395/685 |
| 5,222,062 | 6/1993 | Sharma | 370/56 |
| 5,226,040 | 7/1993 | Noble, III | 370/56 |
| 5,269,021 | 12/1993 | Denio | 395/700 |
| 5,280,586 | 1/1994 | Kunz | 395/275 |
| 5,301,275 | 4/1994 | Vanbuskirk | 395/250 |
| 5,319,754 | 6/1994 | Meinecke | 395/325 |
| 5,359,730 | 10/1994 | Marron | 395/712 |
| 5,402,528 | 3/1995 | Christopher | 395/109 |
| 5,410,703 | 4/1995 | Nilsson et al. | 395/712 |
| 5,430,877 | 7/1995 | Naylor | 395/712 |
| 5,446,726 | 8/1995 | Rostoker | 370/17 |
| 5,450,318 | 9/1995 | Mowers | 364/410 |
| 5,469,545 | 11/1995 | Vanbuskirk | 395/200.01 |
| 5,481,713 | 1/1996 | Wetmore et al. | 395/705 |
| 5,537,596 | 7/1996 | Yu et al. | 395/712 |
| 5,555,418 | 9/1996 | Nilsson et al. | 395/800 |

*Primary Examiner*—Kevin A. Kriess

[57] ABSTRACT

A method for downloading software includes transmitting only that portion of the program which is to be updated or otherwise changed. In a preferred aspect, a key is also transmitted which must match a key last stored in EEPROM, to permit the download to be effected.

9 Claims, 5 Drawing Sheets ical Field

METHOD FOR REPLACING SOFTWARE MODULES UTILIZING A REPLACEMENT ADDRESS TABLE

TECHNICAL FIELD

The present invention relates to downloading of software and, more particularly, to downloading of software structured in modules.

DESCRIPTION OF THE PRIOR ART

Many programs today contain a modular structure that breaks down program functions into modules, each of which modules accomplishes one function and contains all code and variables (e.g., instructions and data) needed to accomplish that function. By segmenting the program into modules that perform clearly defined functions, any program errors, for example, can be located and corrected more easily.

Such modular structure may be useful, for example, in remote monitoring arrangements employed in the elevator industry. See, for example, U.S. Pat. Nos.: 4,568,909; 4,662,538; 5,398,782; 5,440,617 and 5,445,245, which are all hereby incorporated in their entireties by reference.

A commonly used technique for downloading or updating old or incorrect software (program) is to download a complete copy (i.e. all modules) of the new software (i.e., new program). Depending upon the speed of the modems and the amount of instructions and data to transmit, such download can take a long period of time.

The present inventors believe that improvements in downloading (e.g., updating or changing) software can be achieved.

DESCRIPTION OF THE INVENTION

According to the present invention, a method downloads only that portion (e.g., a module) of the software (program) that changes. Thus, the amount of time and data transmitted are reduced.

A preferred method according to the invention for downloading software includes: providing a processor unit having a first non-volatile memory (e.g., ROM) including or containing a plurality of initial software modules which form a program, a second non-volatile memory (e.g., EEPROM) which is erasable and programmable, the second memory includes a code (or program) section and an initial address table for, e.g., the first memory, the processor unit further includes a processor (e.g., microprocessor) electronically coupled to the first and second memories, transmitting a message signal packet to the processor unit, the message signal packet includes a replacement software module and a replacement address table; storing the replacement software module into the code section; replacing the initial address table with the replacement address table; calling one of the initial software modules; and then executing the replacement software module responsive to the calling step. Preferably, when an application calls the one initial software module, a pointer in the replacement address table (e.g., Jump Table) directs the call to the replacement software module stored in EEPROM. The microprocessor then fetches (e.g., via RAM) and executes the replacement software module.

In a further preferred embodiment of the invention, the message signal packet also includes key (e.g., 16 bit) which may be part of the replacement address table.

Accordingly, it is a principal object of the present invention to effect downloading of software efficiently.

It is a further object of the present invention to prevent unauthorized downloads of software.

Further and still other objects of the present invention will become more readily apparent in view of the detailed description in conjunction with the accompanying drawing, in which:

BRIEF DESCRIPTION OF THE DRAWING

FIG. 1A is a schematic diagram of a preferred processor unit configured according to the present invention;

DETAILED DESCRIPTION AND BEST MODE FOR CARRYING OUT THE INVENTION

Figure 1:
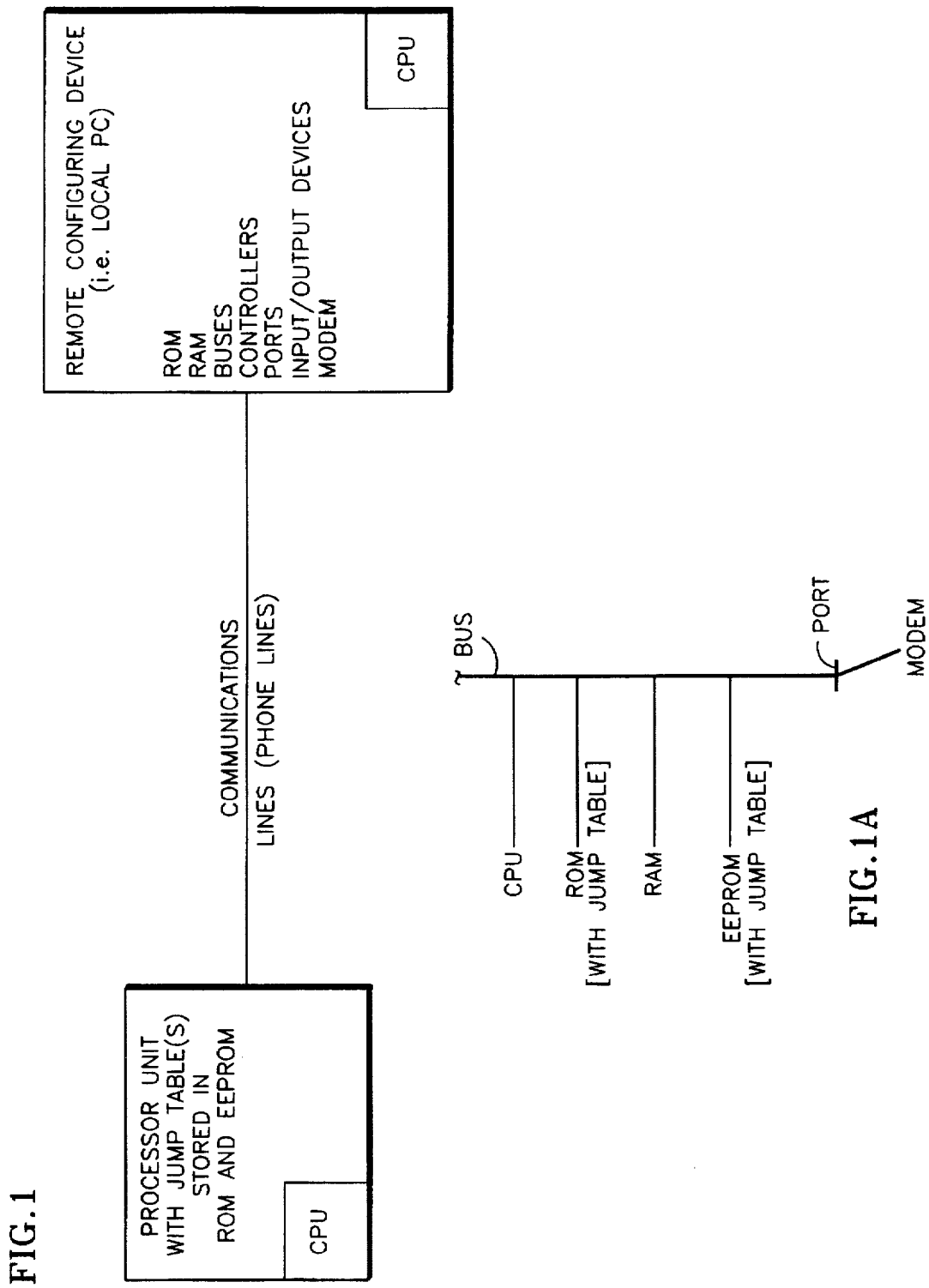
FIG. 1 is a block schematic diagram of a processor unit electronically coupled to an electronic computer (e.g., personal computer or PC) via modems and a communications link to implement the method according to the present invention.
Figure 2:
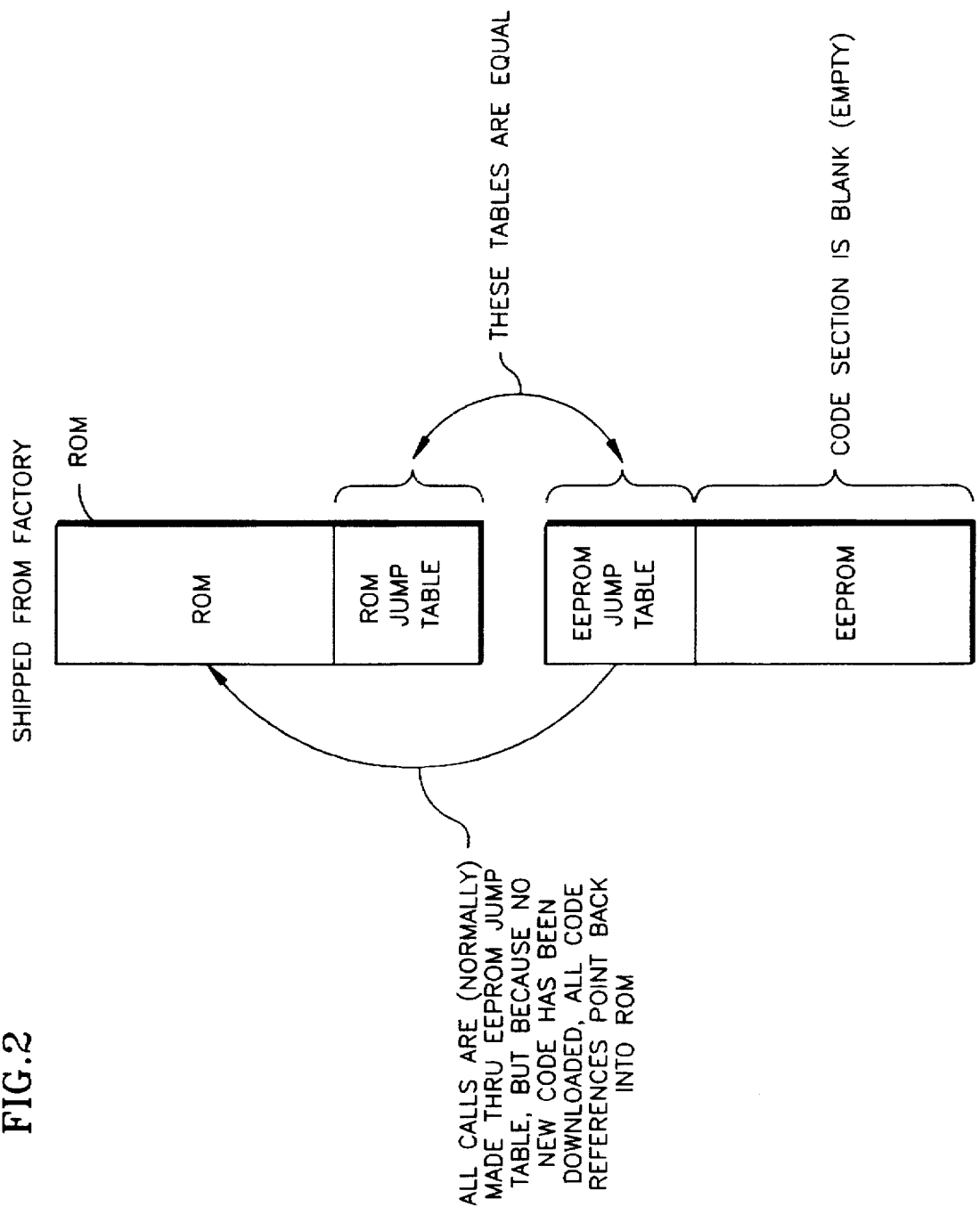
FIG. 2 is a schematic block diagram (including explanatory legends) of a ROM and an EEPROM as initially configured according to the preferred embodiment.
Figure 3:
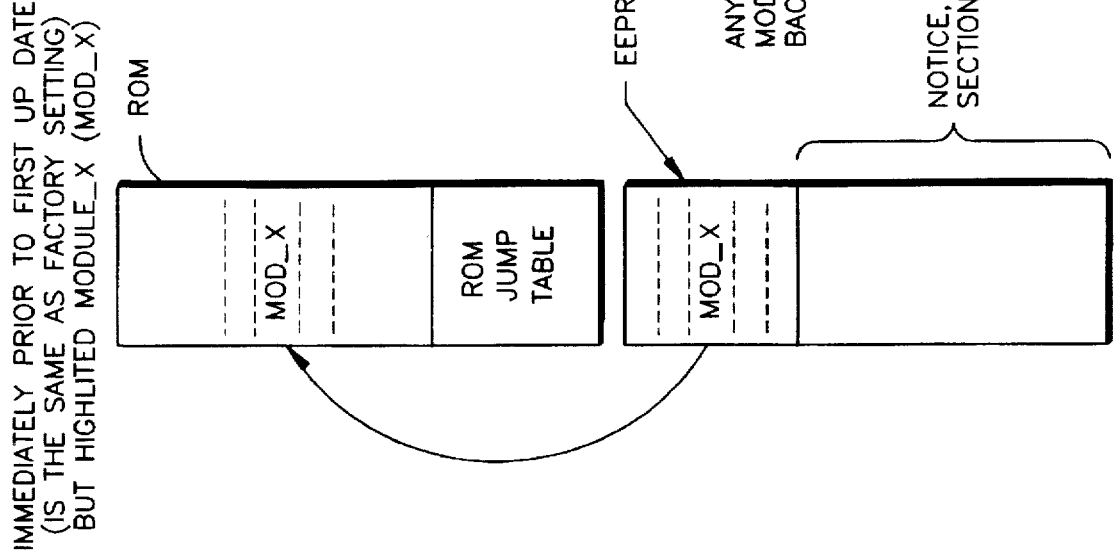
FIG. 3 is a schematic block diagram (including explanatory legends) of the ROM and the EEPROM immediately prior to a first update, according to the preferred embodiment.
Figure 4:
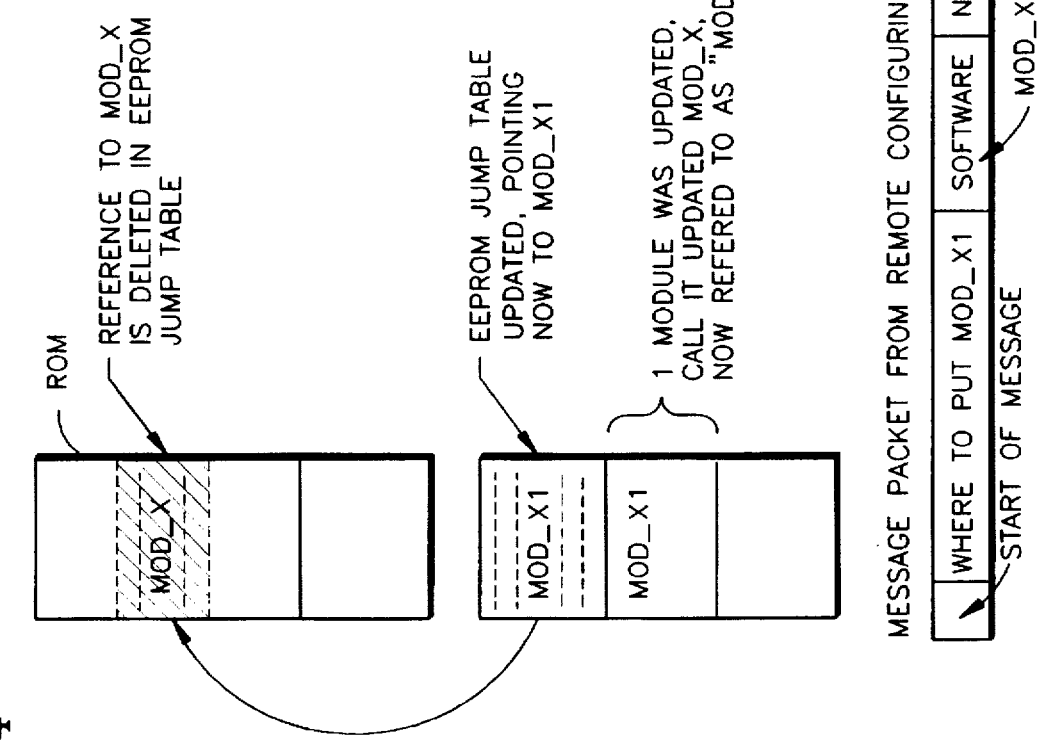
FIG. 4 is a schematic block diagram (including explanatory legends) of the ROM and the EEPROM immediately after the first update, and a diagram of a message signal packet for effecting an update or download, all according to a preferred embodiment of instant invention.
Figure 5:
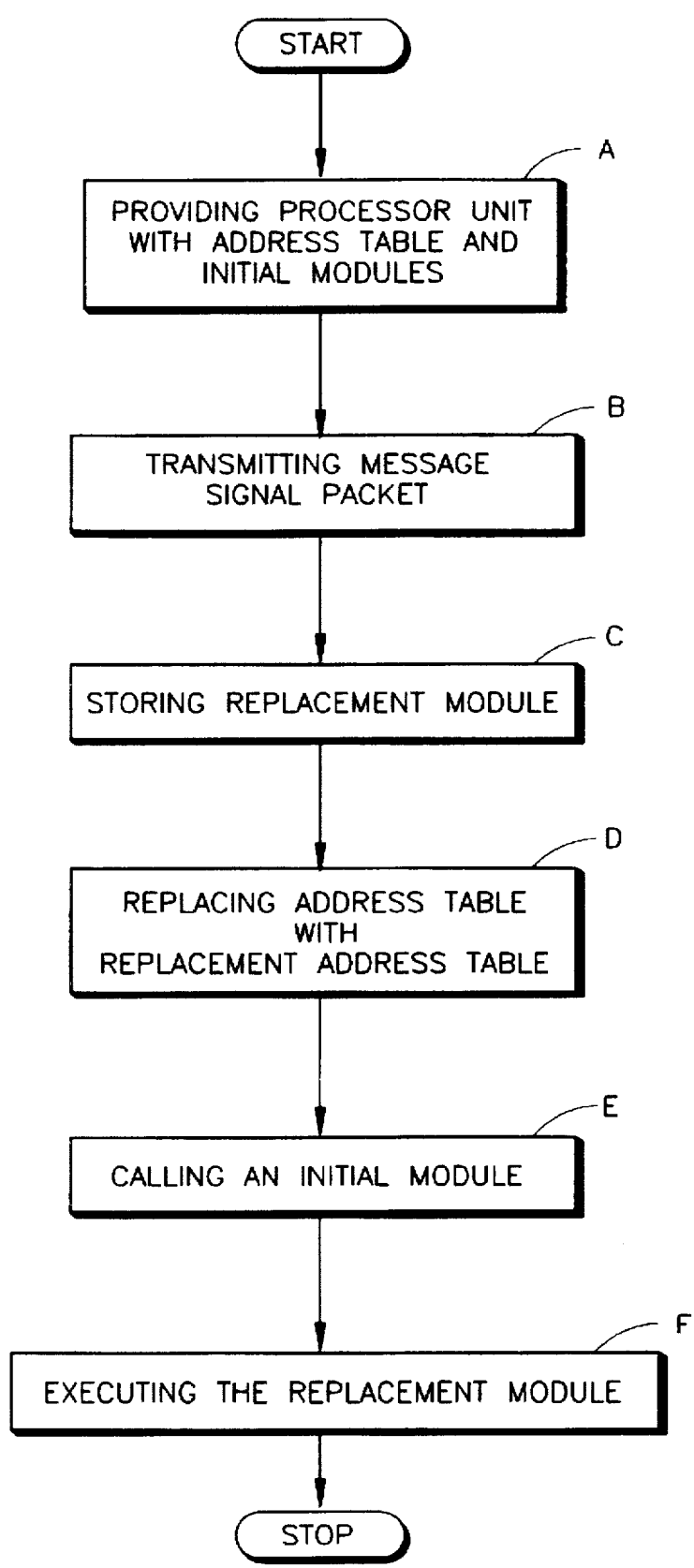
FIG. 5 is a high level logic flow diagram of a preferred method according to the present invention.

Referring now to the FIGS. 1-5, FIG. 1 is a preferred network to implement the present invention (steps A-F of FIG. 5). Those skilled in the art (taken in conjunction with the instant specification) will be readily able to implement the instant invention; e.g., steps B-F may be implemented readily in software. Identical Jump Tables are initially resident in ROM and EEPROM. As shown in FIG. 3, a call to a module MOD_X before an update points to a MOD_X stored in ROM, which module is thereupon fetched and ultimately executed by the CPU in the processor unit. When a message signal packet as shown in FIG. 4 is received by the processor unit of FIG. 1 or FIG. 1A, the EEPROM is updated as shown in FIG. 4. The new EEPROM Jump Table includes, for example, correspondence between MOD_X and the replacement software module (MOD_X1). Only MOD_X1, in addition to the correspondence and address for MOD_X1 and a new EEPROM Jump Table, need to be transmitted to the processor unit, rather than an entire program including all modules. In a further preferred aspect of the present invention, a key is also sent (see FIG. 4) which can be part of the new Jump Table.

To recapitulate, all (e.g., subroutine) calls reference the Jump Table (in EEPROM). The EEPROM directs the subroutine call to either ROM resident or EEPROM resident subroutines. When a software change is required, the new portion of the software (e.g., new module) is downloaded from a remote device (i.e., a Personal Computer) into the EEPROM and the Jump Table in EEPROM is modified (e.g., entirely replaced) to reference the new routine (now) in EEPROM. In the further preferred aspect, the remote device also sends the new signature (key) of the EEPROM. If the sent key matches the key stored in EEPROM, the new module is loaded. The signature (key) of the EEPROM is changed to reflect the new, correct signature (key). If the sent key does not match, the new module is not loaded.

On power up, a self test is performed over all the software resident in the ROM and the EEPROM, including the Jump Table in EEPROM. The result of this test is compared with the stored result (also in EEPROM) sent by the remote device each time the remote device sends new software changes to the EEPROM. If the calculated result matches the stored result, the EEPROM and the Jump Table in EEPROM are valid.

If the calculated result is different from the stored result, it is assumed the EEPROM is corrupt and now a repair procedure is invoked. To repair the damaged or corrupted EEPROM, the EEPROM is erased then a copy of the Jump Table stored in ROM is written to the Jump Table in EEPROM, and an error message is transmitted to the remote device (e.g., PC). At this point, it is assumed, e.g., that all the software routines in EEPROM are corrupt and the remote device must retransmit all (new) software to the EEPROM.

In the further preferred aspect, each Jump Table includes for example a 16 bit key, downloaded by the remote device, that is checked each time a write to the EEPROM is attempted. Each time a remote device attempts to modify the memory (in the processor unit), the remote device sends a key which must match the key in EEPROM. If it does match the key currently stored in EEPROM, the download, i.e. the writes to memory, is allowed. If the keys do not match, the download is prevented.

If the Jump Table in ROM is ever written to the Jump Table in EEPROM, the key in ROM over writes the key in EEPROM.

All hardware to implement the present invention is commercially available. See, e.g., *Memory Products* (ISBN#1-55512-117-9), *Microcommunications* (ISBN# 1-55512-119-5), *Microprocessors* (ISBN# 1-55512-115-2), all published by Intel Corporation, which are all incorporated in their entireties by reference herein.

Although the invention has been shown and described with respect to a best mode embodiment thereof, it should be understood by those skilled in the art that various changes, omissions and additions in the form and detail thereof may be made therein without departing from the spirit and scope of the invention.

What is claimed is:

1. A method for downloading software, comprising:
   providing a processor unit which includes a first non-volatile memory including a plurality of initial software modules which form a program, and which includes a second non-volatile memory, the second non-volatile memory being an erasable programmable non-volatile memory, the second memory including a code section and an address table, the processor unit further including a processor coupled to the first and second memories;
   transmitting a message signal packet to the processor unit, the message signal packet including a replacement software module and a replacement address table;
   storing the replacement software module into the code section;
   replacing the address table with the replacement address table;
   calling one of the initial software modules, and then
   executing the replacement software module responsive to said calling step.

2. A method as claimed in claim 1, wherein the second non-volatile memory is a flash EEPROM.

3. A method as claimed in claim 1, wherein the first non-volatile memory includes an address table.

4. A method as claimed in claim 3, wherein the address table of the first memory includes information identical to information included within the address table of the second memory.

5. A method as claimed in claim 1, wherein the address table is a jump table which includes information to point a call to software stored in the first memory.

6. A method as claimed in claim 1, wherein the replacement address table is a jump table to point a call to a module stored within the second memory.

7. A method as claimed in claim 1, further comprising, prior to said storing step, a step of comparing a key stored in the message signed packet with a key stored in the address table of the second memory.

8. A method as claimed in claim 7, wherein said step of storing further comprises storing the replacement software module into the code section only if the key in the packet matches the key in the address table.

9. A method for downloading software, comprising:
   providing a processor unit which includes a first non-volatile memory including a plurality of initial software modules which form a program, and which includes a second non-volatile memory, the second non-volatile memory being an erasable programmable non-volatile memory, the second memory including a code section and a table of addresses of said initial software modules, the processor unit further including a processor coupled to the first and second memories;
   transmitting a message signal packet to the processor unit, the message signal packet including a replacement software module and a replacement table of addresses of said replacement software module and all software modules other than the one replaced by said replacement software module,
   storing the replacement software module into the code section;
   replacing the address table with the replacement address table;
   calling one of the initial software modules, and then
   executing the replacement software module responsive to said calling step.

* * * * *